March 24, 1959 J. S. PILCH 2,878,951
SIDE DIGGER

Filed July 12, 1955 3 Sheets-Sheet 1

INVENTOR.
JOHN S. PILCH
BY
Raymond A. Paquin
ATTORNEY.

March 24, 1959  J. S. PILCH  2,878,951
SIDE DIGGER
Filed July 12, 1955  3 Sheets-Sheet 2
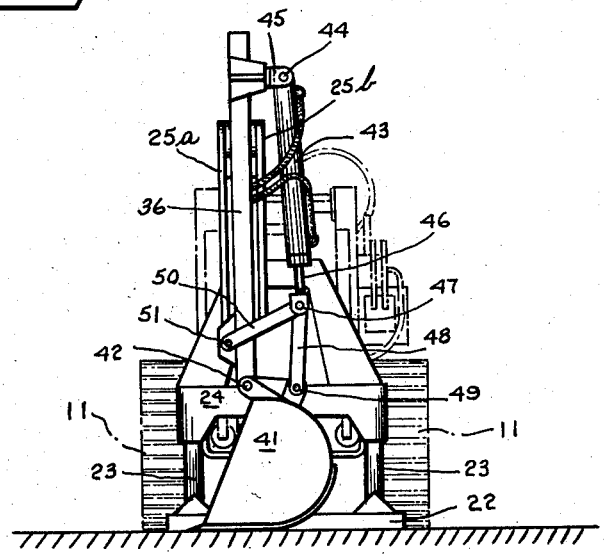
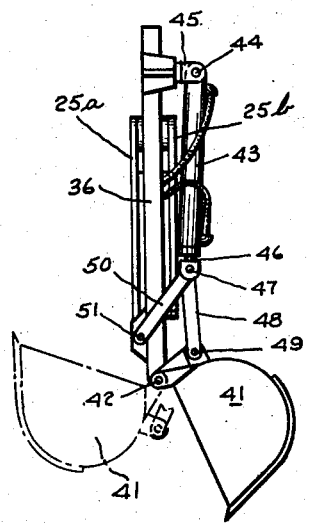
INVENTOR.
JOHN S. PILCH
BY
ATTORNEY.

March 24, 1959

J. S. PILCH 2,878,951

SIDE DIGGER

Filed July 12, 1955

INVENTOR.
JOHN S. PILCH
BY
ATTORNEY.

United States Patent Office 2,878,951
Patented Mar. 24, 1959

2,878,951

SIDE DIGGER

John S. Pilch, Ware, Mass.

Application July 12, 1955, Serial No. 521,454

4 Claims. (Cl. 214—138)

This invention relates to a new and improved trencher or the like and has particular reference to such a device which is adapted to be tractor mounted and which utilizes the tractor power supply as a power source.

An object of the present invention is to provide a new and improved apparatus of the type set forth which may be utilized for digging trenches or ditches in cranberry bogs or the like where it is not feasible to drive the trencher.

Another object of the invention is to provide a new and improved apparatus of the type set forth which may be easily and quickly attached to and detached from a tractor and which is a completely self-contained unit.

Another object is to provide a new and improved apparatus of the type set forth which allows the digging over a relatively wide range without the necessity of moving the tractor or vehicle.

Another object is to provide an apparatus of the type set forth which is relatively simple, compact and inexpensive.

Another object is to provide an apparatus of the type set forth which allows the digging or trenching in directions normal to or parallel with the axis of the tractor or vehicle.

Other objects and advantages of the invention will be apparent from the following description taken in connection with the accompanying drawings. It will be understood that changes may be made in the details of construction and arrangement of parts shown and described without departing from the spirit of the invention as set forth in the accompanying claims, as the preferred form has been given by way of illustration only.

Referring to the drawings:

Fig. 2 is a view taken on line 2—2 looking in the direction of the arrows;

Fig. 3 is a fragmentary view generally similar to Fig. 2, but illustrating the operation of the device.

Figure 1:
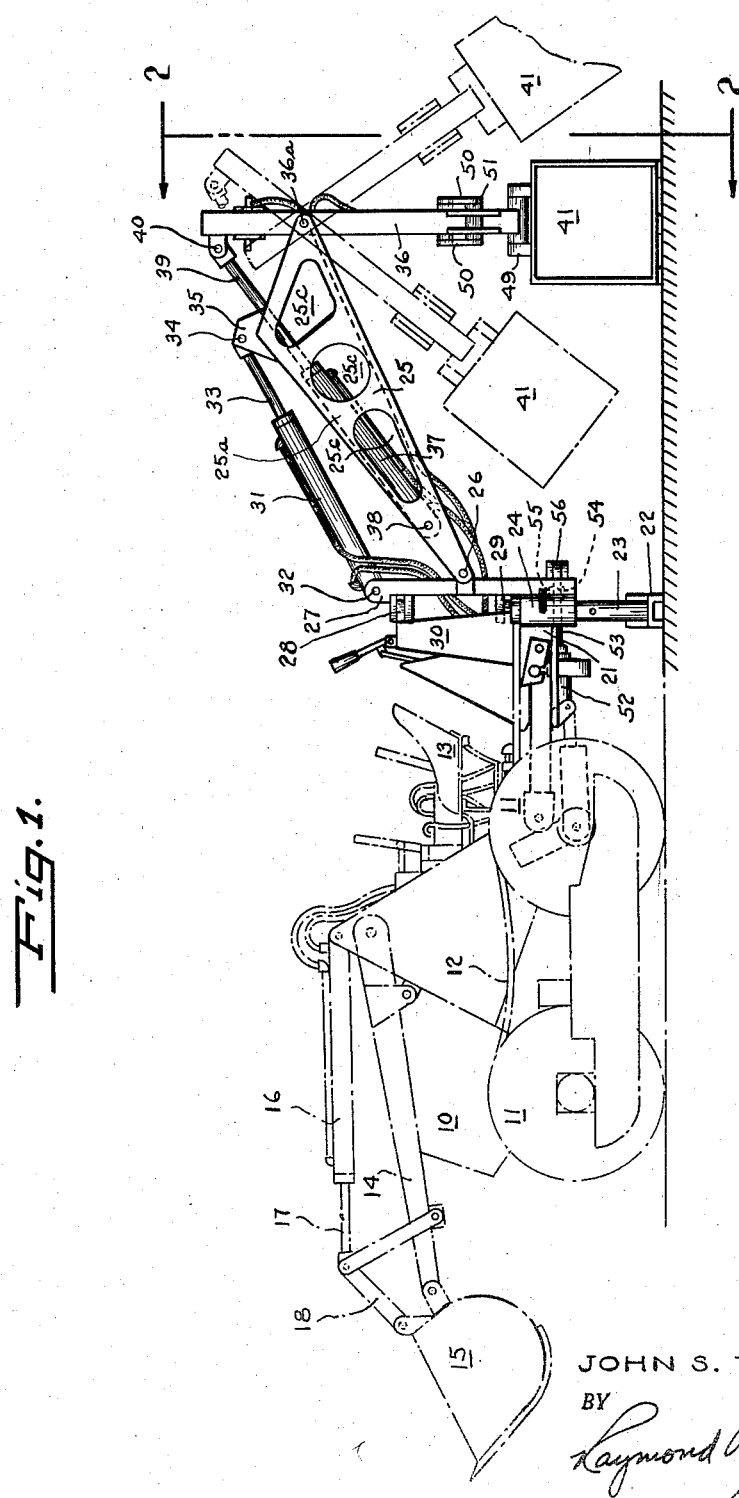
Fig. 1 is a side view of an apparatus embodying the invention.

Referring more particularly to the drawings wherein similar reference characters designate corresponding parts throughout the several views, the arrangement shown comprises a tractor having an engine 10, wheels 11, track 12 and operator's seat 13.

On the tractor may be mounted a loader including the loader or push arms 14, bucket 15 and the bucket pivoting cylinder 16, ram 17 and link 18.

The loader mechanism does not form any part of the invention but has been shown merely to illustrate the apparatus that may be carried by the tractor and which may be employed independently of the trenching apparatus.

The trenching apparatus is detachably connected to the rear of the tractor in the manner set forth in my application Serial No. 438,413, filed June 22, 1954, to which application reference is made for further de- description.

The trencher apparatus is carried by the detachable platform 21, as described in my application set forth above, and beneath the platform 21 and connected thereto is the trencher outrigger structure comprising the ground engaging supports 22 connected to the uprights 23 which are in telescoping relation with the supports 24 to which they are adjustably connected by means of pins which may be positioned in any of various holes, whereby the outrigger may be connected in vertically adjusted position relative to the support or platform 21.

The trenching apparatus shown comprises the boom 25 pivotally mounted at 26 on the upright support 27 for vertical pivotal movement and the support 27 is pivotally connected by the pivots 28 and 29 to the support 30 for swinging or pivotal movement relative thereto.

The hydraulic cylinder 31 is pivotally connected at 32 to the upper end of support 27 and the ram 33 which extends into cylinder 31 is pivotally connected at 34 to the bracket or ear 35 on boom 25.

The dipper stick 36 is pivotally connected to boom 25 at 36a intermediate the ends of dipper stick 36 and the hydraulic cylinder 37 is pivotally connected at 38 to boom 25 and ram 39 is pivotally connected at 40 to the upper end of dipper stick 36.

Boom 25 comprises the spaced side members 25a and 25b connected by suitable connecting members out of interfering position. The boom may be formed from a single piece of material or separate pieces secured together and the cutouts 25c may be provided of desired contour to lighten the structure and yet provide adequate support and protection for the dipper stick cylinder 37 and ram 39.

The cylinder 37 and ram 39 are adapted to pivot the dipper stick about pivot 36a, as shown in Fig. 1.

The trencher shovel or scoop shovel 41 is pivotally connected at 42 to dipper stick 36 adjacent the lower end thereof so the digging edge of the bucket lies in a plane parallel to the axis of boom 25 and shovel 41 is adapted to be rotated or pivoted relative to dipper stick 36 by means of hydraulic cylinder 43 which is pivotally connected at 44 to bracket or lug member 45 which is connected to dipper stick 36 adjacent the upper end thereof and ram 46 is pivotally connected at 47 to shovel link 48 which, in turn, is pivotally connected at 49 to shovel 41 and, also, to link 50 which is pivotally connected at its opposite end at 51 to dipper stick 36 or an ear thereon adjacent the lower end thereof.

It will be seen that because of the interposition of links 48 and 50 that the shovel may be rotated around the lower end of dipper stick 36 to a much greater degree of rotation than would otherwise be possible, as shown in Fig. 3.

The support 27, boom 25, dipper stick 36 and shovel 41 are rotatable as a unit about support 30 by means of hydraulic cylinder 52 and ram 53 which is pivotally connected at 54 to link 55 which is pivotally connected at 56 to turret or support 27. By this means the scoop shovel may be actuated to dig by horizontal movement.

By this arrangement, it is possible with a single cylinder and ram to swing the support or turret 27 and boom in an arc of at least 180 degrees and by use of positioning, link 54 practically assures substantially constant true speed of travel throughout the entire range of travel and, also, allows greater range of swing.

It will also be seen that this arrangement utilizes but a single piston and cylinder thus providing a more compact and inexpensive unit.

In operation, by adjusting the boom to desired position and the dipper stick and trencher shovel, or scoop shovel to desired relation, the pivoting of the support 27 will effect pivotal movement of boom 25 and move the shovel horizontally to fill the shovel which then may be raised by raising the boom and pivoting the dipper stick to dumping position. For obtaining a greater amount of material in the shovel and to prevent the spilling of material during the loading operation, the shovel may be rotated by cylinder 43, ram 46 and links 48 and 50, as previously described, to the position shown in broken lines in Fig. 3 and when the shovel has been raised to dumping position, the rotating of the shovel back into the position shown in full lines in Fig. 3 will allow the material to drop from the shovel.

Figure 4:
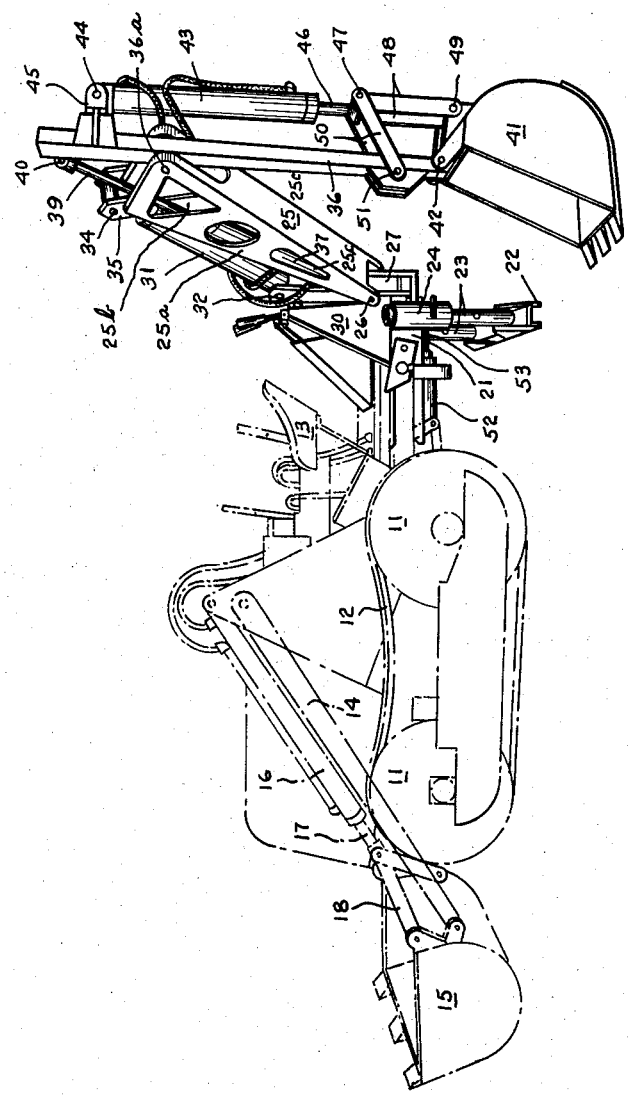
Fig. 4 is a side view showing the apparatus in one operative position.

In Fig. 4, the apparatus is shown in operative position for digging in cranberry bogs or other places where the vehicle cannot travel. As will be seen from this figure, the apparatus can be so set that the shovel will dig or trench in spaced parallel relation with the vehicle, that is, the vehicle can travel along the edge of the cranberry bog, or the like, and the boom and dipper stick can be adjusted whereby the shovel will trench or dig parallel with the vehicle.

From the foregoing, it will be seen that I have provided new and improved means for obtaining all of the objects and advantages of the invention.

I claim:

1. In a device of the character described, a support, a pivotable support connected to said support for pivotal movement about a vertical axis, a boom pivotally connected about a horizontal axis to said pivotable support, hydraulic means for raising and lowering said boom relative to said support, a dipper stick pivotally connected to said boom about a horizontal axis perpendicular to the longitudinal axis of said boom, hydraulic means connected to said boom and to said dipper stick for pivoting said dipper stick relative to said boom, a single trencher shovel, a pivot on the end of said dipper stick lying in a plane parallel to the plane of said boom and said dipper stick, said trencher shovel being mounted on said pivot for pivotal movement around and beyond the end of said dipper stick in a plane normal to the plane of said dipper stick and boom, the digging edge of said trencher shovel being parallel to said pivot on the end of said dipper stick, whereby digging may be accomplished by pivoting said pivotal support on its vertical axis.

2. In a device of the character described, a support, a pivotable support connected to said support for pivotal movement, about a vertical axis, a boom pivotally connected about a horizontal axis to said pivotable support, hydraulic means for raising and lowering said boom relative to said support, a dipper stick pivotally connected to said boom about a horizontal axis perpendicular to the longitudinal axis of said boom, hydraulic means connected to said boom and to said dipper stick for pivoting said dipper stick relative to said boom, a single trencher shovel, a pivot on the end of said dipper stick lying in a plane parallel to the plane of said boom and said dipper stick, said trencher shovel being mounted on said pivot for pivotal movement around and beyond the end of said dipper stick in a plane normal to the plane of said dipper stick and boom, the digging edge of said trencher shovel being parallel to said pivot on the end of said dipper stick, whereby digging may be accomplished by pivoting said pivotal support on its vertical axis and hydraulic means for rotating said bucket relative to said dipper stick.

3. In a device of the character described, a support, a pivotable support connected to said support for pivotal movement about a vertical axis, a boom pivotally connected about a horizontal axis to said pivotable support, hydraulic means for raising and lowering said boom relative to said support, a dipper stick pivotally connected to said boom about a horizontal axis perpendicular to the longitudinal axis of said boom, hydraulic means connected to said boom and to said dipper stick for pivoting said dipper stick relative to said boom, a single trencher shovel, a pivot on the end of said dipper stick lying in a plane parallel to the plane of said boom and said dipper stick, said trencher shovel being mounted on said pivot for pivotal movement around and beyond the end of said dipper stick in a plane normal to the plane of said dipper stick and boom, the digging edge of said trencher shovel being parallel to said pivot on the end of said dipper stick, whereby digging may be accomplished by pivoting said pivotal support on its vertical axis, hydraulic means for pivoting said support to thereby pivot said boom and dipper stick and hydraulic means for pivoting said dipper stick relative to said boom whereby said bucket is moved in a sidewise direction to dumping position.

4. In a device of the character described, a support, a pivotable support connected to said support for pivotal movement about a vertical axis, a boom pivotally connected about a horizontal axis to said pivotable support, hydraulic means for raising and lowering said boom relative to said support, a dipper stick pivotally connected to said boom about a horizontal axis perpendicular to the longitudinal axis of said boom, hydraulic means connected to said boom and to said dipper stick for pivoting said dipper stick relative to said boom, a single trencher shovel, a pivot on the end of said dipper stick lying in a plane parallel to the plane of said boom and said dipper stick, said trencher shovel being mounted on said pivot for pivotal movement around and beyond the end of said dipper stick in a plane normal to the plane of said dipper stick and boom, the digging edge of said trencher shovel being parallel to said pivot on the end of said dipper stick, whereby digging may be accomplished by pivoting said pivotal support on its vertical axis, hydraulic means for pivoting said support to thereby pivot said boom and dipper stick, hydraulic means for pivoting said bucket relative to said dipper stock.

References Cited in the file of this patent

UNITED STATES PATENTS

| | | |
|---|---|---|
| D. 162,873 | Pilch | Apr. 10, 1951 |
| 753,282 | Mahoney | Mar. 1, 1904 |
| 2,501,112 | Webster | Mar. 21, 1950 |
| 2,506,759 | Wommer | May 9, 1950 |
| 2,678,741 | Pilch | May 18, 1954 |
| 2,698,697 | Holopainen | Jan. 4, 1955 |
| 2,770,379 | Przybylski | Nov. 13, 1956 |

OTHER REFERENCES

Gradall Publication G5405-7-5410M (20 pages), received in U.S. Patent Office May 31, 1955.